United States Patent
Mocnik et al.

(10) Patent No.: US 9,939,016 B2
(45) Date of Patent: Apr. 10, 2018

(54) TWO-PART BEARING CAGE

(71) Applicants: Alexander Mocnik, Steyr (AT); Thomas Forster, Waidhofen/Ybbs (AT); Matthias Zauner, Wolfern (AT)

(72) Inventors: Alexander Mocnik, Steyr (AT); Thomas Forster, Waidhofen/Ybbs (AT); Matthias Zauner, Wolfern (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/296,210

(22) Filed: Oct. 18, 2016

(65) Prior Publication Data
US 2017/0108043 A1   Apr. 20, 2017

(30) Foreign Application Priority Data
Oct. 20, 2015  (DE) ........................ 10 2015 220 363

(51) Int. Cl.
*F16C 33/38* (2006.01)

(52) U.S. Cl.
CPC ...... *F16C 33/3875* (2013.01); *F16C 2208/36* (2013.01); *F16C 2220/04* (2013.01); *F16C 2226/12* (2013.01); *F16C 2226/74* (2013.01); *F16C 2226/76* (2013.01)

(58) Field of Classification Search
CPC .............. F16C 33/3875; F16C 33/3856; F16C 33/3862; F16C 33/3843
See application file for complete search history.

(56) References Cited

U.S. PATENT DOCUMENTS

| 3,586,405 | A | * | 6/1971 | Claesson | F16C 33/3875 384/526 |
| 4,493,513 | A | * | 1/1985 | Osawa | F16C 33/3887 384/523 |
| 5,906,441 | A | * | 5/1999 | Seki | F16C 19/163 384/523 |
| 8,408,808 | B2 | | 4/2013 | Hosmer | |
| 8,961,023 | B2 | * | 2/2015 | Mineno | F16C 33/3875 384/470 |
| 9,022,662 | B2 | * | 5/2015 | Ito | F16C 19/06 384/470 |

(Continued)

FOREIGN PATENT DOCUMENTS

| DE | 20100572 U1 | 4/2001 |
| DE | 69925976 T2 | 5/2006 |

(Continued)

*Primary Examiner* — Thomas R Hannon
(74) *Attorney, Agent, or Firm* — Bryan Peckjian; SKF USA Inc. Patent Dept.

(57) ABSTRACT

A two-part bearing cage for a rolling-element bearing includes first and second identical cage halves each including an annular base body, a plurality of pins extending axially from the annular base body, and a plurality of pin receptacles, each of the plurality of pin receptacles having a shape complementary to a shape of a pin. Each of the pins on one cage half engages into one of the receptacles of the other cage half to form bearing cage bridges and pockets between the bridges, and each of the receptacles includes a radially outwardly disposed, axially extending ring wall section that radially outwardly supports the pin received in that receptacle.

15 Claims, 4 Drawing Sheets

(56) References Cited

U.S. PATENT DOCUMENTS

| | | | |
|---|---|---|---|
| 9,103,374 B2 | 8/2015 | Fukama et al. | |
| 9,512,880 B2 * | 12/2016 | Yasuda | F16C 33/3875 |
| 2007/0230849 A1 * | 10/2007 | Naito | F16C 33/3875 |
| | | | 384/530 |
| 2012/0060634 A1 | 3/2012 | Ueno et al. | |
| 2015/0377289 A1 | 12/2015 | Scheidel et al. | |

FOREIGN PATENT DOCUMENTS

| | | |
|---|---|---|
| DE | 102010007789 A1 | 8/2011 |
| JP | 2004076778 A | 3/2004 |
| JP | 2006258174 A | 9/2006 |
| JP | 2007040383 A | 2/2007 |
| JP | 2007078059 A | 3/2007 |
| JP | 2007113592 A | 5/2007 |
| JP | 2007198583 A | 8/2007 |
| JP | 2014020468 A | 2/2014 |

\* cited by examiner

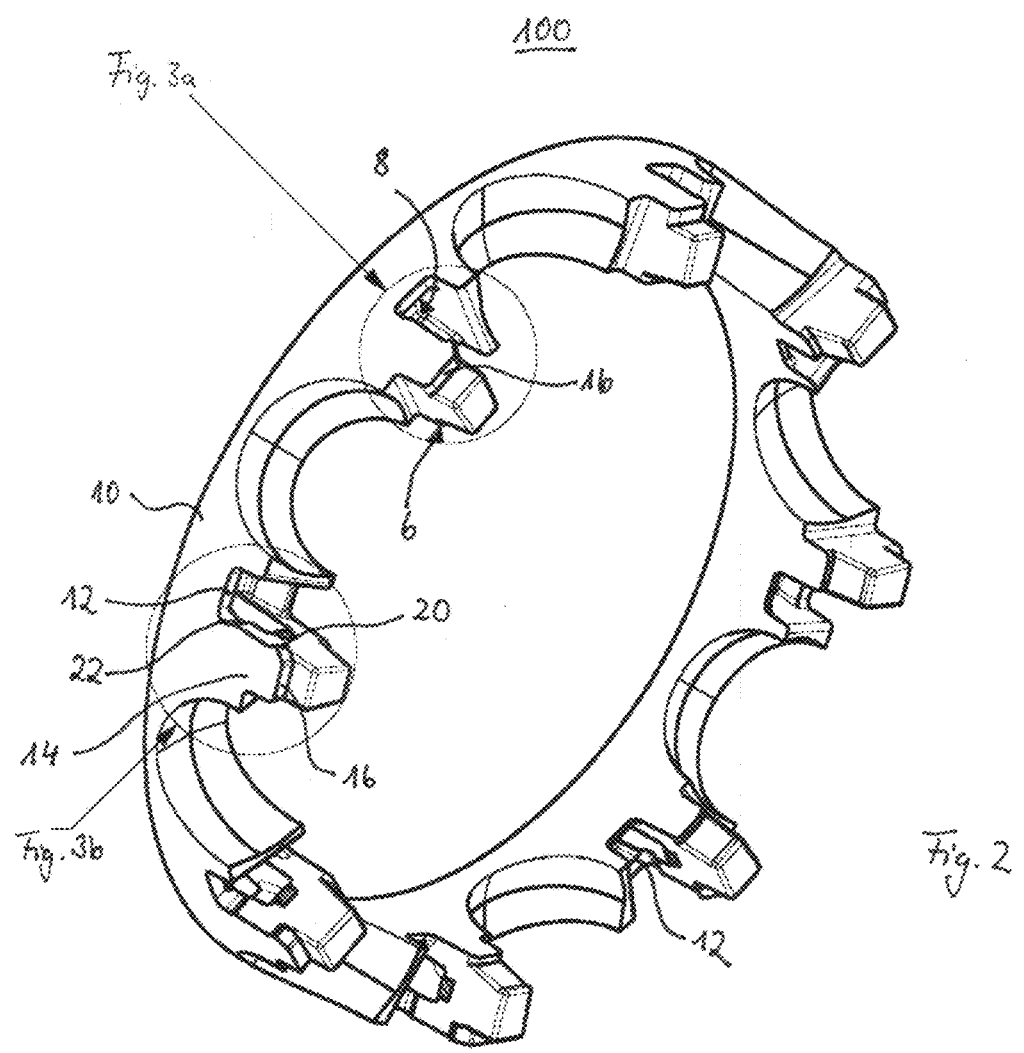
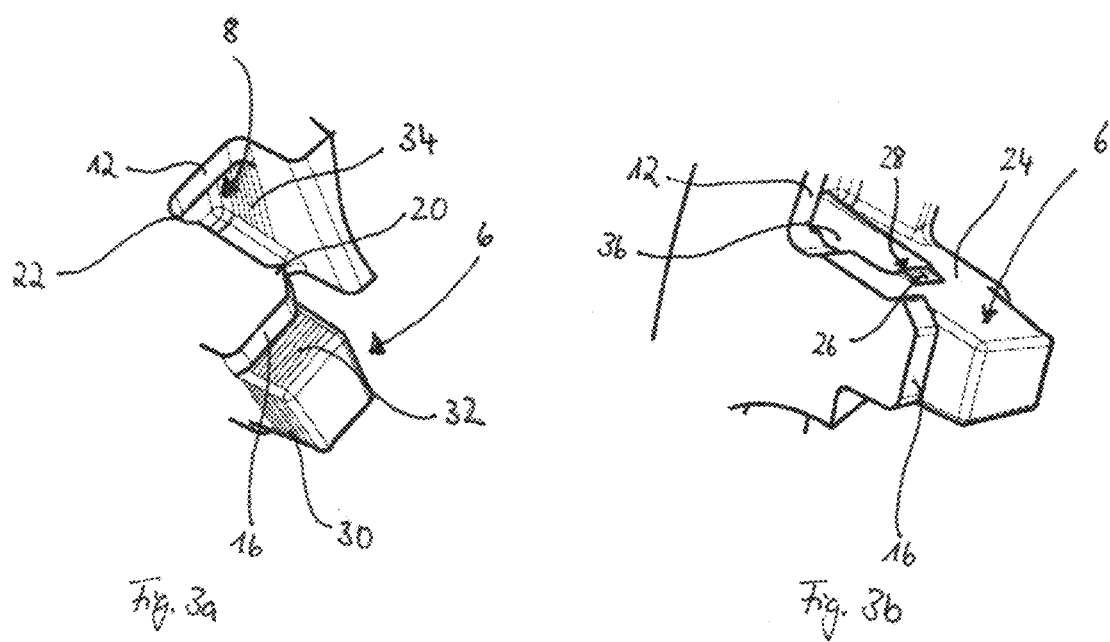

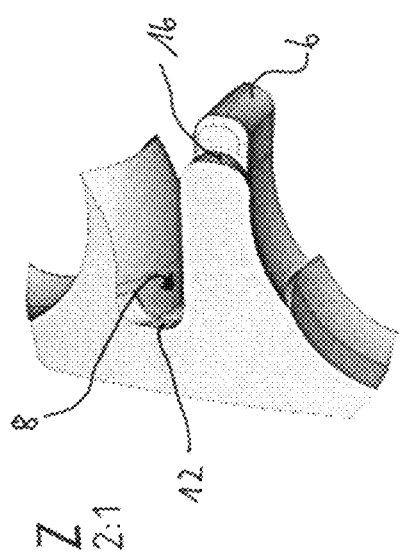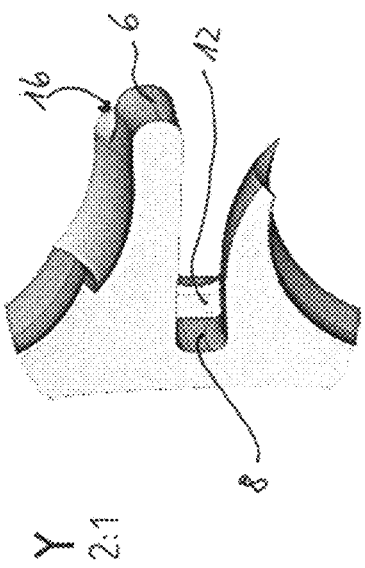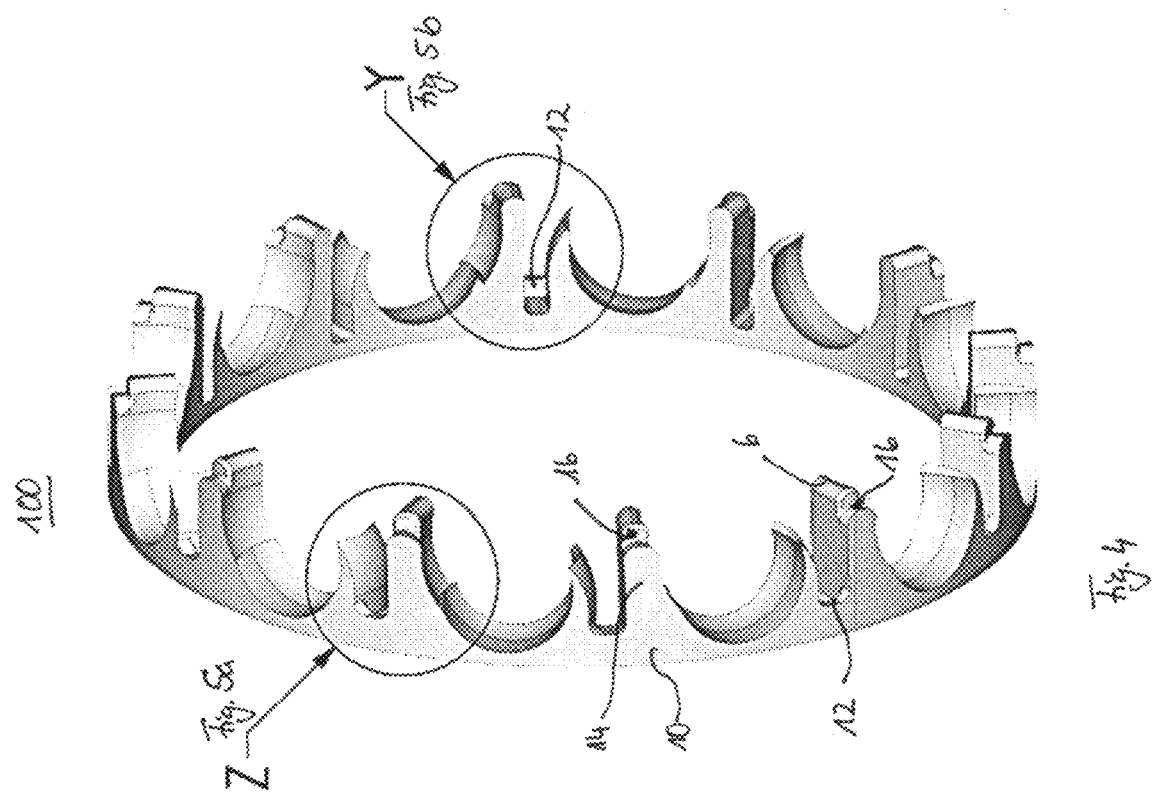

TWO-PART BEARING CAGE

CROSS-REFERENCE

This application claims priority to German patent application no. 10 2015 220 363.8 filed on Oct. 20, 2015, the contents of which are fully incorporated herein by reference.

TECHNICAL FIELD

The present disclosure is directed to a two-part bearing cage for a rolling-element bearing.

BACKGROUND

Two-part bearing cages are known from the prior art, for example, DE 69925976 or DE 102012222799 (a family member of US 2015/0377289), which are composed of identical bearing-cage halves. However, it is disadvantageous with these known bearing cages that the brackets used for connecting the bearing-cage halves bend radially outward at high rotational speeds so that an expanding of the cage and thus a contact with the outer ring and thus an increased friction or a clamping of the rolling elements can result.

A bearing cage is also known from the prior art, for example, DE 102010007789, in which the retaining lugs are in fact radially supported, but the special design of this cage only allows an even number of balls in order to be able to design the arrangement of retaining lugs, retaining receptacles, and rolling-element pockets. In addition, the retaining lugs are stressed both in the radial and in the axial direction during the attaching of the cage halves, so that in the event of a failure of one or more retaining lugs, both the radial and the axial support of the cage is lost, which in turn leads to an immediate bearing failure.

SUMMARY

An aspect of the present disclosure is therefore to provide a two-part bearing cage that is suited even for high rotational speeds and withstands high radial and axial loads.

In the following disclosure, a two-part bearing cage for a rolling-element bearing is disclosed that includes a first cage half and a second cage half, preferably designed identical to the first cage half, wherein each cage half includes an annular base body and pins extending axially therefrom and complementarily designed pin receptacles. Here the pins of the one cage half engage into the pin receptacles of the other cage half so that with engagement into the pin receptacles the pins form bearing-cage bridges, between which the bearing-cage pockets for receiving the rolling elements of the rolling-element bearing are formed. In order to allow no bending-open of the pins radially outward to arise even with high rotational speeds, each pin receptacle is furthermore designed such that it includes a radially outwardly disposed, axially extending ring section, which radially outwardly supports each pin engaging into the pin receptacle. Since this radial supporting is provided for each pin, it can be ensured that even at high rotational speeds no contact of the bearing cage to the outer ring arises, so that neither the friction increases nor is a too-early bearing failure to be expected.

Here it is advantageous in particular if the axially extending ring section is formed around and/or about and/or as part of the annular base body of the cage half. Due to this integral design between ring section and the annular base body, radial forces that are introduced on the ring section can be diverted or directed to the base body so that even with high stress of the ring section an expanding of the cage radially outward is prevented.

According to a further advantageous exemplary embodiment each pin includes a gradation or step facing radially outward that interacts with the ring section of the pin receptacle such that the cage bridge formed by the pin and pin receptacle has a homogeneous outer surface. This homogeneous outer surface makes it possible that, for example, lubricant that is located in the region of the bearing and of the bearing cage is not collected in recesses on the cage body, thus causing the lubricant flow and thus the lubrication of the rolling elements to no longer be available. In addition the homogeneous outer surface makes it possible that a trouble-free guiding of the rolling elements is possible via the cage bridges.

In order to be able to support axially acting forces and to prevent a falling-apart or separation of the cage halves, at least one of the pins and/or at least one of the pin receptacles has at least one interference-fit, axially acting attaching structure. It is advantageous in particular here if the interference-fit, axially acting attaching structure is formed on all pins or all pin receptacles in order not to establish any preferred orientation during assembly. Of course, however, it would be possible to form the axial interference-fit attaching structure only on some pins.

According to a further advantageous exemplary embodiment the interference-fit attaching structure is formed via a dovetail connection between the pin and the pin receptacle. Here the pin includes, for example, at its end entering into the pin receptacle a widening that can snap-in into a widened receptacle on the pin-receptacle floor.

It is advantageous in particular here if the widening on the pin is elastically deformed during the assembly of the cage and then elastically compressed into the widened receptacle on the pin-receptacle floor.

Alternatively or additionally the interference-fit attaching structure can also be configured such that at least one pin of each cage half includes a snap lug and a snap recess, wherein the snap lug and the snap recess are configured such that the snap lug of the one cage half snaps-in into the snap recess of the other cage half. The assembly and manufacturability of the cage or of the cage halves is greatly facilitated by an axially acting interference-fit connection configured in this manner.

Furthermore an exemplary embodiment is advantageous wherein in addition or alternatively to the other interference-fit attaching structures a radially extending retaining lug including a circumferentially extending retaining edge is formed on at least one pin of each cage half, wherein the at least one retaining lug of the one cage half is designed so as to engage on the retaining edge of the at least one retaining lug of the other cage half or to axially support the retaining edge of the at least one retaining lug. This design also represents a simple-to-manufacture and easy-to-use in operation axial securing of the bearing cage halves to each other.

Instead of a pure interference fit, the axial attaching can also be provided via friction-fit connecting elements. Thus for example a pin and/or a pin receptacle can include at least one wall with a high surface roughness, which prevents a sliding-out of the pin from the pin receptacle. Here the surface roughness can be provided, for example, via a serration so that a pin introduced into the pin receptacle is held in the pin receptacle due to the interference-fit connection and/or due to the friction-fit connection. Of course, instead of the serration the surface can also be roughened in another manner, for example, sandblasted.

This surface roughness has the further advantage that a radial supporting or attaching can also thereby be provided, in particular if the circumferentially extending walls of the pin or of the pin receptacle have an increased surface roughness.

According to a further advantageous exemplary embodiment an opening is formed on a circumferential side of at least one pin, which side faces the pin receptacle, via which opening the position of the pin in the pin receptacle is observable. It can be ensured by such openings serving as inspection windows that the two cage halves engage into each other axially and radially and the attachment elements are completely in engagement with each other in the axial or radial direction. A misjudgment regarding the assembly situation can thereby be prevented. Here the opening can be configured such that, for example, with an incorrect assembly between the pin and an edge of the inspection-window a gap remains that indicates faulty assembly.

According to a further preferred exemplary embodiment each one cage half includes one cage-pocket half-shell per cage pocket, wherein the cage pocket overall has a toroidal pocket geometry. With spherical rolling elements it is preferred if the pocket geometry is adapted radially inward to a ball casing and radially outward extends cylindrically. Due to this toroidal pocket geometry the rolling elements, in particular the balls, can be completely enclosed radially inward, which leads to a particularly good rolling-element guiding. In contrast the cylindrical outer design of the pocket geometry allows a good supplying of lubricant, since the rolling elements are not directly enclosed radially outward, but rather a gap remains between each rolling element and a pocket through which gap lubricant can easily penetrate.

According to a further preferred exemplary embodiment the bearing cage is manufactured from a plastic, in particular from an injection-moldable plastic. The use of polyether ether ketone (PEEK) with or without fiber reinforcement is particularly advantageous here. In fact such plastic cages are easy to produce and also simple to assemble in two-part form, but precisely with plastic cages an expanding of the cage is to be observed at high rotational speeds. For this reason if high rotational speeds were expected the bearing cages were conventionally produced from metal, for example, brass. However, metal bearing cages are significantly more difficult to produce, and when formed as two-part bearing cages must be connected via rivets, which is time- and cost-intensive. However, the above-described supporting of the pins makes it possible to form bearing cages from plastic even when the cages are intended to be used at high rotational speeds.

Further advantages and advantageous embodiments are defined in the description, the drawings, and the claims. Here in particular the combinations of features specified in the description and in the drawings are purely exemplary, so that the features can also be present individually or combined in other ways.

In the following discussion the disclosure shall be described in more detail with reference to the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 2 is a schematic spatial view of a cage half of the bearing cage depicted in FIG. 1.

FIGS. 3a, 3b are schematic detail views of the cage half depicted in FIG. 2.

FIG. 4 is a schematic spatial depiction of a second exemplary embodiment of a bearing-cage half.

FIGS. 5a, 5b are schematic detail views of the bearing-cage half depicted in FIG. 4.

DETAILED DESCRIPTION

In the following, identical or functionally equivalent elements are designated by the same reference numbers.

Figure 1:
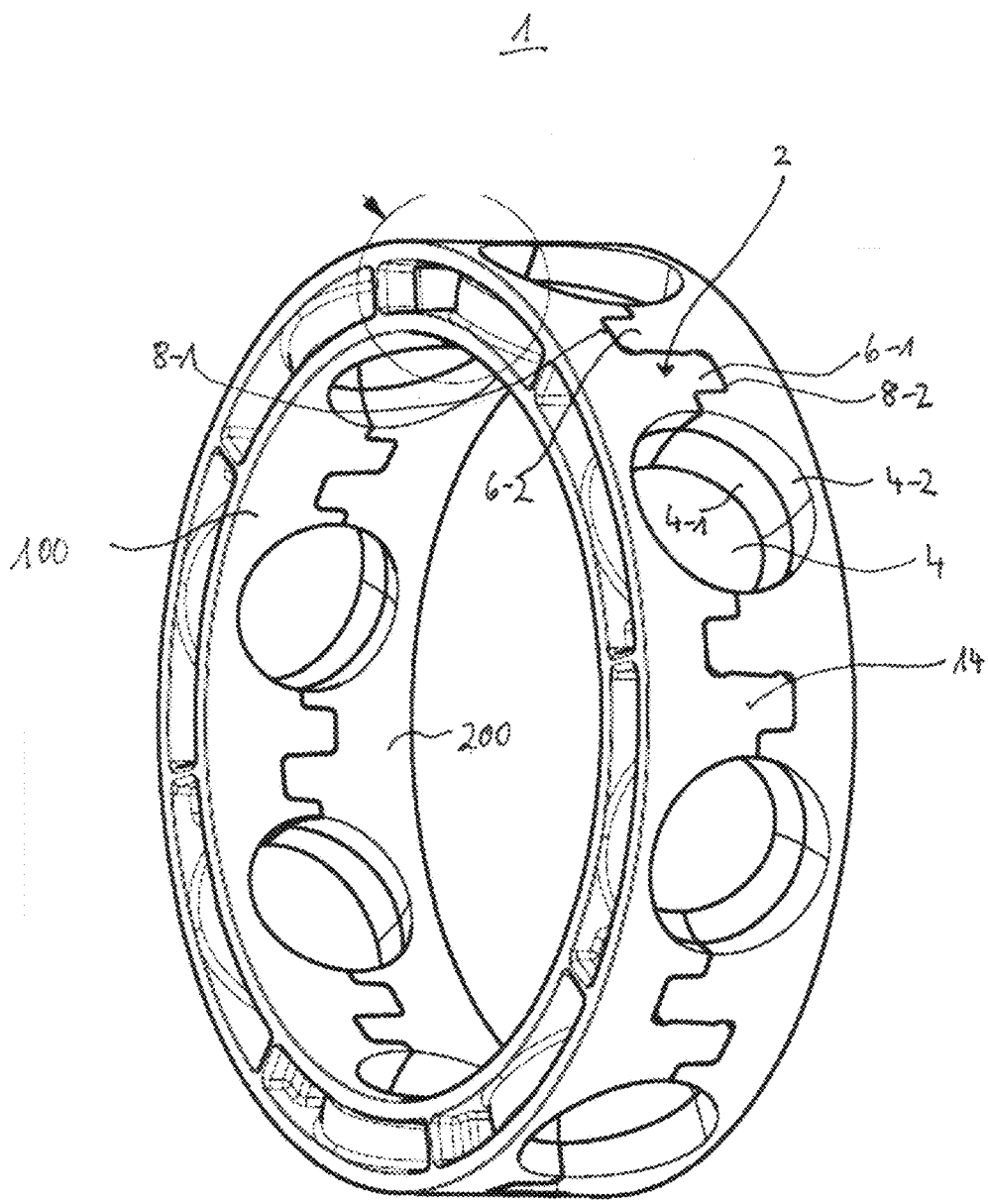
FIG. 1 is a schematic spatial view of a first exemplary embodiment of the two-part bearing cage.

FIG. 1 shows a schematic spatial view of a bearing cage for a ball bearing 1 that is composed of a first bearing-cage half 100 and a second bearing-cage half 200. Here the bearing-cage halves 100 and 200 are identically configured. As can be further seen from FIG. 1, the bearing cage 1 has bridges 2 that form cage pockets 4 therebetween in which pockets 4 rolling elements (not depicted) are receivable. Here the cage pockets 4 have a toroidal shape; this means that the cage pockets 4 are configured spherical on their radially inner side 4-1, while they are configured cylindrical on their radially outer side. This toroidal design makes it possible that the rolling elements, i.e., the balls, are radially inwardly 4-1 well guided and entirely enclosed in the pockets 4, while on their radially outer region 4-2 they have a spacing from the bearing cage such that lubricant can penetrate in a gap between the rolling elements and the bearing cage, whereby a particularly good lubricating of the balls is made possible. It can furthermore be seen from FIG. 1 that the cage bridge 2 is formed via the mutual engaging of pins 6-1, 6-2 in corresponding pin receptacles 8-1, 8-2 of the respective cage half 100, 200. The engagement of the pins 6-1, 6-2 into the pin receptacles 8-2, 8-1 is configured here such that both a radial and an axial fixing of the cage halves 100, 200 is possible.

This radial and axial securing is clear in particular with consideration of the cage half 100 of the cage 1 and in the enlarged detail views of FIGS. 3a and 3b (showing the embodiment of FIG. 1) and FIGS. 5a, and 5b (showing the embodiment of FIG. 4). As can be seen from the Figures, each cage half 100 includes an annular base body 10 from which the pins 6 extend outwardly, and in which the pin receptacles 8 are formed. Here each pin receptacle 8 includes an axially extending ring section 12 that extends over the pin 6 when it is received in the pin receptacle 8 and thus supports the pin 6 from a radially outward direction. This axial ring section 12 helps ensure that even under high centrifugal forces the cage pins 6 do not bend radially outward and contact a bearing ring receiving the bearing cage 1, which can lead to increased friction and premature bearing failure. Furthermore it can be seen in FIGS. 2 to 5 that the ring section 12 is formed integrally with the annular base body 10. The radial forces can thereby be supported and diverted in the base body 10, so that even with high radial loads a bending-open of the cage 1 does not occur.

In order to achieve a particularly good engagement and, as depicted in FIG. 1, achieve a homogeneous outer surface 14 on the bearing cage 100, the pin 6 includes a gradation or step 16 that interacts with the ring section 12. The design of the pin 6 and the pin receptacle 8 can also be seen in enlarged sections of FIGS. 3a, 3b, 5a, and 5b. In addition, it can be seen from FIG. 2 and in particular from FIGS. 3a and 3b that for an axial attaching of the two bearing cage halves 100, 200 a tangential snap lug 20 as well as a snap recess 22 complementary thereto can be formed on the pin 6, wherein the snap recess 22 is configured to receive the snap lug 20 of the pin (not shown here) immersed into the pin receptacle 8.

Figure 6:
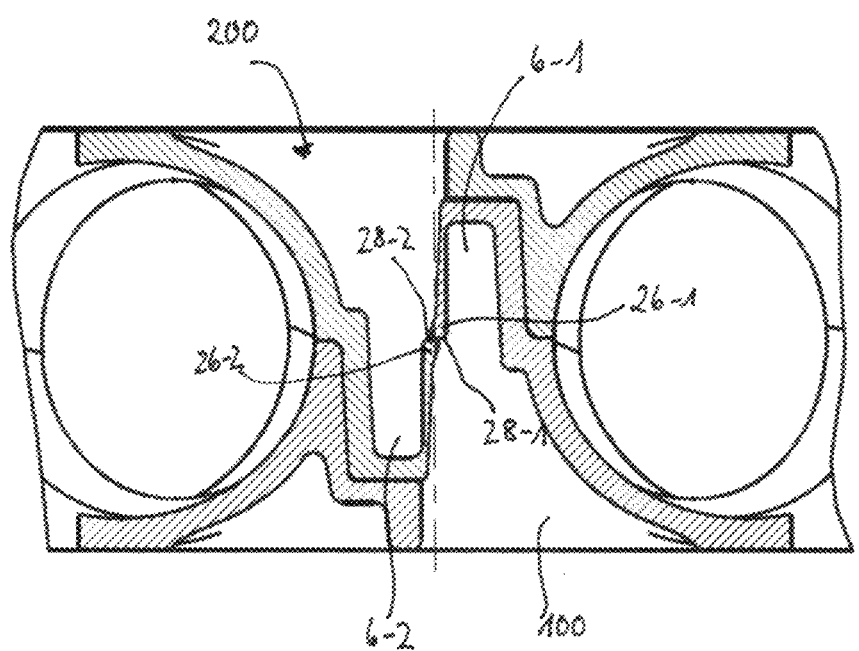

Furthermore, on a tangential surface 24 of the pin 6, as depicted in particular in FIG. 3*b*, a retaining lug 26 can be formed that includes a retaining edge 28. This retaining edge 28 serves to axially support the retaining edge of the pin 6 engaging into the pocket 8. For a better understanding of this engagement reference is made to FIG. 6, which depicts a section through the bearing cage along the bridge 2. It can be seen here that the retaining lug 26-1 of the first cage half 100 is supported with its retaining edge 28-1 on the retaining edge 28-2 of the retaining lug 26-2 of the second cage half, so that an axial pushing-apart of the bearing cage halves 100, 200 is not possible.

Furthermore, at least one wall 30, 32, 34 with a high surface roughness, for example, a fluting or a surface roughened mechanically, for example, by a sandblasting, can additionally or alternatively be provided on the pin 6 or in the pin receptacle 8. The increased surface roughness makes possible not only an interference-fit connection, but also a friction-fit connection of the pin 6 in the pin receptacle 8. Here it is particularly preferred if the tangential surfaces 30, 34 of the pin 6 or of the pin receptacle 8 have such a surface roughness that the radial supporting and radial force-supporting is further supported in particular with high centrifugal forces.

Figure 7:
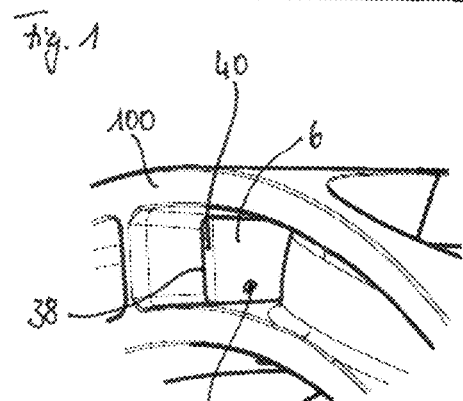
FIGS. 6-7 are detail views of the bearing cage from FIG. 1.

Furthermore, in order to check the assembly situation of the cage 1, as can be seen, for example, from FIG. 3*b*, an opening 36 can be formed on the tangential surface 24 of the pin 6, via which the position of a pin 6 disposed in the pin receptacle 8 is observable. Thus, for example, FIG. 7 shows the view at the opening 36 from the bearing-cage exterior, wherein the opening 36 includes an axial opening edge 38. If a gap 40 is formed, as depicted in FIG. 7, between the opening edge 38 and a pin 6 received in the pin receptacle, then this gap 40 indicates that the pin 6 is not yet completely received by the receptacle 8, and therefore a complete axial and radial attaching of the bearing cage halves 100, 200 to each other has not yet occurred. Of course other assembly inspecting functions are also conceivable.

Overall with the proposed bearing cage 1 a two-part bearing cage 1 can be provided that does not expand even with high centrifugal forces. Since both bearing-cage halves 100, 200 are identically configured, also only one injection mold is needed for manufacturing, which significantly simplifies manufacturing. If both cage halves 100, 200 and all elements disposed therein are also identical, then the bearing cage halves 100, 200 can also be directly disposed on each other without further assembly aids and assembled into a bearing cage 1.

In order to prevent a bending outward of the pins 6 even with high centrifugal forces, each pin receptacle 8 furthermore includes an axially extending ring section 12 that supports the pins 6 radially outward. Various interference-fit and friction-fit connections are possible for the axial securing of the bearing halves 100, 200, wherein in particular the above-depicted snap connections make possible a particularly simple and fast attachment of the bearing halves 100, 200 to each other. Furthermore via surface roughnesses a friction-fit component can be introduced that on the one hand supports the interference-fit attachment; on the other hand it is also conceivable that the interference-fit attachment can be completely replaced by the friction-fit connections. Such cages are in particular simple and quick to manufacture from a plastic, in particular from a polyether ether ketone (PEEK), with or without filler material. These plastics are injection-moldable and thereby make possible a quick and simple manufacturing even with complex structure in large quantities. The plastic cage simultaneously makes possible the above-depicted snap connections so that an expensive joining, for example via rivets, can be omitted. Since all pins are supported radially outward, even with an embodiment made from plastic it can be ensured that the bearing cage maintains its shape even with high rotational speeds and no contact arises to the bearing outer rings receiving the cage.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cage.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing cage
100, 200 Bearing-cage half
2 Bridge
4 Cage pocket
6 Pin
8 Pin receptacle
10 Annular base body
12 Axially extending ring section
14 Outer surface
16 Gradation
20 Snap lug
22 Snap recess
24 Tangential side surface
26 Retaining lug
28 Retaining edge
30, 32, 34 Side surface of the pin or of the pin receptacle
36 Inspection opening
38 Opening edge
40 Gap

What is claimed is:

1. A two-part bearing cage for a rolling-element bearing comprising a first cage half and a second cage half identical to the first cage half;
   wherein each of the first and second cage halves comprises an annular base body, a plurality of pins extending axially from the annular base body, and a plurality of pin receptacles, each of the plurality of pin receptacles being configured to receive one of the plurality of pins;
   wherein each of the plurality of pins of the first cage half engages into one of the pin receptacles of the second cage half, and wherein each of the plurality of pins of the second cage half engages into one of the pin receptacles of the first cage half to form bearing-cage bridges, adjacent ones of the bearing-cage bridges defining bearing-cage pockets for receiving rolling elements;
   wherein each of the plurality of pin receptacles includes a radially outwardly disposed, axially extending ring wall section that radially outwardly supports the one of the plurality of pins in the respective pin receptacle; and
   wherein at least one of the plurality of pins of the first cage half and at least one of the plurality of pins of the second cage half include a snap lug and a snap recess, wherein the snap lug of the at least one of the plurality of pins of the first cage half is snapped into the snap recess of the at least one of the plurality of pins of the second cage half.

2. The two-part bearing cage according to claim 1, wherein each of the axially extending ring wall sections is integrally formed with the annular base body of the first cage half or with the annular base body of the second cage half.

3. The two-part bearing cage according to claim 1, wherein each of the plurality of pins includes a radially outward facing gradation configured to meet with the ring wall section of each of the plurality of pin receptacles such that each cage bridge has a smooth outer surface.

4. A two-part bearing cage for a rolling-element bearing comprising a first cage half and a second cage half identical to the first cage half;
   wherein each of the first and second cage halves comprises an annular base body, a plurality of pins extending axially from the annular base body, and a plurality of pin receptacles, each of the plurality of pin receptacles being configured to receive one of the plurality of pins;
   wherein each of the plurality of pins of the first cage half engages into one of the pin receptacles of the second cage half, and wherein each of the plurality of pins of the second cage half engages into one of the pin receptacles of the first cage half to form bearing-cage bridges, adjacent ones of the bearing-cage bridges defining bearing-cage pockets for receiving rolling elements;
   wherein each of the plurality of pin receptacles includes a radially outwardly disposed, axially extending ring wall section that radially outwardly supports the one of the plurality of pins in the respective pin receptacle;
   wherein at least one of the plurality of pins and/or at least one of the plurality of pin receptacles has at least one axially acting attaching structure configured to create an interference fit; and
   wherein the axially acting attaching structure comprises a dovetail connection between the at least one of the plurality of the pins and the at least one of the plurality of the pin receptacles.

5. The two-part bearing cage according to claim 4,
   wherein an axially extending retaining lug with a circumferentially extending retaining edge is formed on at least one of the plurality of pins of the first cage half and on at least one of the plurality of pins of the second cage half, and
   wherein the axially extending retaining lug on the at least one of the plurality of pins of the first cage half is configured to engage and/or axially support the retaining edge of the axially extending retaining lug of the at least one of the plurality of pins of the second cage half.

6. The two-part bearing cage according to claim 5, wherein the at least one of the plurality of pins of the first cage half includes a fluted surface and/or a blasted surface for forming a friction fit.

7. The two-part bearing cage according to claim 4, wherein at least one of the plurality of pins of the first cage half is attached to one of the plurality of pin receptacles of the second cage half by a friction fit.

8. The two-part bearing cage according to claim 4, wherein one of the plurality of pins includes a side circumferentially facing one of the plurality of pin receptacles, the side including an opening via which a position of the one of the plurality of pins in the one of the plurality of pin receptacles is observable.

9. The two-part bearing cage according to claim 4, wherein the first cage half and the second cage half each include a cage-pocket half-shell, wherein the bearing-cage pocket formed by the cage-pocket half-shell of the first cage half and the cage-pocket half-shell of the second cage half has a toroidal pocket geometry that is radially inwardly configured to a ball surface and radially outwardly extends cylindrically.

10. The two-part bearing cage according to claim 4, wherein the cage is manufactured from polyether ether ketone (PEEK).

11. A two-part bearing cage for a rolling-element bearing comprising a first cage half and a second cage half identical to the first cage half;
   wherein each of the first and second cage halves comprises an annular base body, a plurality of pins extending axially from the annular base body, and a plurality of pin receptacles, each of the plurality of pin receptacles being configured to receive one of the plurality of pins;
   wherein each of the plurality of pins of the first cage half engages into one of the pin receptacles of the second cage half, and wherein each of the plurality of pins of the second cage half engages into one of the pin receptacles of the first cage half to form bearing-cage bridges, adjacent ones of the bearing-cage bridges defining bearing-cage pockets for receiving rolling elements;
   wherein each of the plurality of pin receptacles includes a radially outwardly disposed, axially extending ring wall section that radially outwardly supports the one of the plurality of pins in the respective pin receptacle;
   wherein each of the axially extending ring wall sections is integrally formed with the annular base body of the first cage half or with the annular base body of the second cage half,
   wherein each of the plurality of pins includes a radially outward facing gradation configured to meet with the ring wall section of each of the plurality of pin receptacles such that each cage bridge has a smooth outer surface, and wherein a first set of the plurality of pins of the first cage half and a first set of the plurality of pins of the second cage half includes a snap lug and a snap recess, wherein the snap lug of the first set of the plurality of pins of the first cage half is snapped into the snap recess of the first set of the plurality of pins of the second cage half.

12. The two-part bearing cage according to claim 11, wherein an axially extending retaining lug with a circumferentially extending retaining edge is formed on a second set of the plurality of pins of the first cage half and on a second set of the plurality of pins of the second cage half, and wherein the axially extending retaining lug on the first set of the plurality of pins of the first cage half is configured to engage and/or axially support the retaining edge of the axially extending retaining lug of the second set of the plurality of pins of the second cage half, wherein one of the plurality of pins includes a side circumferentially facing one of the plurality of pin receptacles, the side including an opening via which a position of the one of the plurality of pins is observable.

13. The two-part bearing according to claim 12, wherein at least one of the plurality of pins and/or at least one of the plurality of pin receptacles has at least one axially acting attaching structure configured to create an interference fit, the axially acting attaching structure comprising a dovetail connection between the at least one of the plurality of the pins and the at least one of the plurality of the pin receptacles, and wherein the cage is manufactured from polyether ether ketone (PEEK).

14. The two-part bearing cage according to claim 11, wherein the axially extending ring wall of one of the plurality of pin receptacles of the first cage half radially overlies an end portion of one of the plurality of pins of the second cage half.

15. The two-part bearing cage according to claim 14, wherein the axially extending ring wall of one of the plurality of pin receptacles of the second cage half radially overlies an end portion of one of the plurality of pins of the first cage half.

* * * * *